(12) United States Patent
Jacobs et al.

(10) Patent No.: US 6,891,498 B2
(45) Date of Patent: May 10, 2005

(54) INERTIAL REFERENCE SYSTEM FOR A SPACECRAFT

(75) Inventors: Jack H. Jacobs, Glendale, AZ (US); Marc E. Meffe, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 43 days.

(21) Appl. No.: 10/108,306

(22) Filed: Mar. 28, 2002

(65) Prior Publication Data

US 2003/0192996 A1 Oct. 16, 2003

(51) Int. Cl.[7] .............................................. H04B 7/185
(52) U.S. Cl. ...................................... 342/355; 244/164
(58) Field of Search ......................... 342/355; 701/13; 244/164, 165, 171; 74/5.22, 5.34

(56) References Cited

U.S. PATENT DOCUMENTS

| | | | |
|---|---|---|---|
| 4,445,376 A | 5/1984 | Merhav | |
| 4,512,192 A | 4/1985 | Peters | |
| 4,723,735 A | 2/1988 | Eisenhaure et al. | |
| 4,732,353 A | 3/1988 | Studer | |
| 4,825,716 A | 5/1989 | Roberts et al. | |
| 5,386,738 A | 2/1995 | Havenhill | |
| 5,437,420 A | 8/1995 | Rosen | |
| 5,611,505 A | 3/1997 | Smay | |
| 5,692,707 A | 12/1997 | Smay | |
| 5,875,676 A | 3/1999 | Bailey et al. | |
| 6,022,005 A | * 2/2000 | Gran et al. | 267/136 |
| 6,039,290 A | 3/2000 | Wie et al. | |
| 6,047,927 A | 4/2000 | Heiberg et al. | |
| 6,128,556 A | 10/2000 | Bailey | |
| 6,131,056 A | 10/2000 | Bailey et al. | |
| 6,135,392 A | 10/2000 | Wakugawa | |
| 6,182,582 B1 | 2/2001 | Bailey et al. | |
| 6,340,137 B1 | 1/2002 | Davis et al. | |

OTHER PUBLICATIONS

International Search Report PCT/US03/09742, Jul. 25, 2003.

* cited by examiner

Primary Examiner—Theodore M. Blum

(57) ABSTRACT

An inertial reference system for a spacecraft includes an attitude control assembly and a plurality of force sensors. The attitude control assembly is coupled to a spacecraft body at a plurality of attachment points and at least one of the plurality of force sensors is integrated at each of the attachment points. In one embodiment, the force sensors are piezoelectric transducers. In another embodiment, the control assembly is coupled to the spacecraft body at four attachment points. In yet another embodiment, each of the force sensors is preloaded by a bolt that attaches the attitude control assembly to the spacecraft body.

22 Claims, 3 Drawing Sheets

INERTIAL REFERENCE SYSTEM FOR A SPACECRAFT

BACKGROUND OF THE INVENTION

The present invention is generally directed to an inertial reference system and, more specifically, to an inertial reference system for a spacecraft.

Today, many spacecraft attitude control systems (ACSs) utilize attitude control assemblies (ACAs), e.g., reaction wheel assemblies (RWAs) or control moment gyros (CMGs), to control the movement of an associated spacecraft. Typically, an inertial sensor has been incorporated within the spacecraft to allow the spacecraft ACS to determine the effect on the spacecraft when the speed of a wheel of an RWA has been changed or when a wheel of a CMG has been deviated from its main rotation axis. In a typical system, power for the inertial sensor, as well as other sensors (e.g., earth, sun and star sensors), and the wheels of an RWA or CMG have been provided via a central power bus, whose voltage may vary, e.g., between twenty and one-hundred volts. Due to the variation in bus voltage, each sensor and ACA has typically included its own internal power regulator, to provide an appropriate voltage level to the electronics of each assembly.

In addition, each sensor and wheel has normally included an interface, which may provide and receive information in a designated format (e.g., 1553 protocol). In a typical spacecraft, each sensor or wheel provides information to a central ACA processing system, such that the processing system can determine the telemetry of the spacecraft. In such spacecrafts, the inertial sensor has generally been designed with separate power and telemetry cables that couple the sensor to a primary power source (e.g., an array of solar panels) and the processing system. In this manner, the ACA processing system computes the spacecraft rates based on inputs provided directly from the inertial sensor.

It would be desirable for a spacecraft inertial reference system to include a secondary source of inertial reference information, which can provide a backup to inertial reference information provided by an inertial sensor. It would also be desirable for a spacecraft inertial reference system to include a source of inertial reference information that can be utilized in place of inertial reference information that has typically been provided by an inertial sensor, obviating the need for the inertial sensor, while at the same time reducing required cabling.

SUMMARY OF THE INVENTION

An embodiment of the present invention is directed to an inertial reference system for a spacecraft that includes an attitude control assembly (ACA) and a plurality of force sensors. The ACA is coupled to a spacecraft body at a plurality of attachment points and at least one of the force sensors is integrated at each of the attachment points. In one embodiment, the force sensors are piezoelectric transducers. In another embodiment, the ACA is coupled to the spacecraft body at four attachment points. In yet another embodiment, each of the force sensors is preloaded by a bolt that attaches the ACA to the spacecraft body. In still other embodiments, the ACA may be a reaction wheel assembly (RWA) or a control moment gyro (CMG).

These and other features, advantages and objects of the present invention will be further understood and appreciated by those skilled in the art by reference to the following specification, claims and appended drawings.

DETAILED DESCRIPTION OF THE PREFERRED EMBODIMENT(S)

Figure 4:
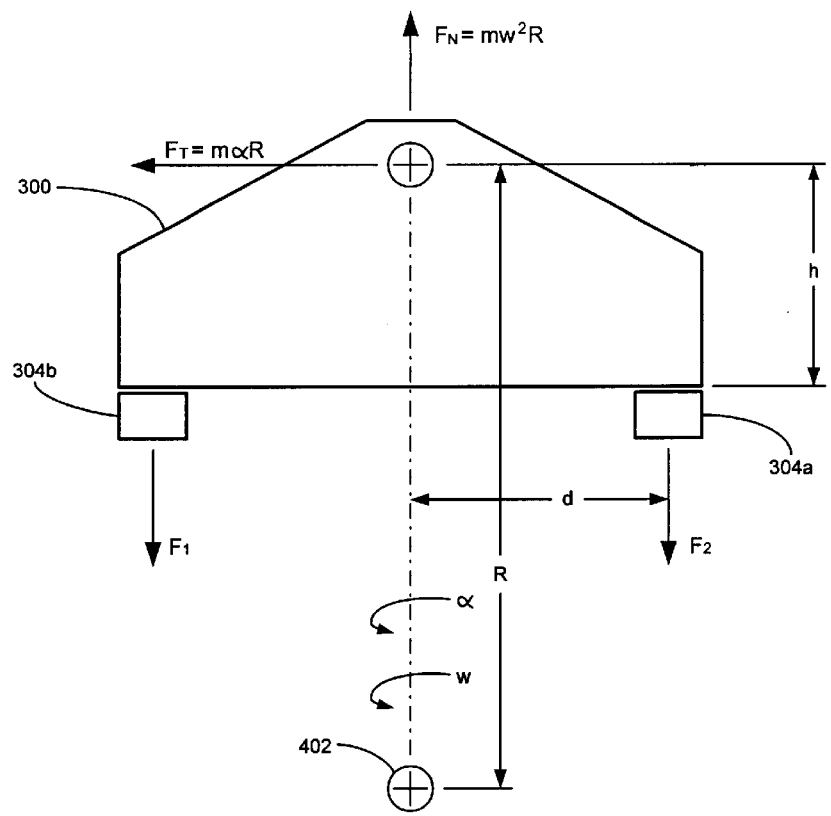
FIG. 4 is a force diagram for an attitude control assembly that is coupled to a spacecraft body, according to the present invention.

The present invention is directed to the integration of force sensors, e.g., piezoelectric transducers, at attachment points between an attitude control assembly (ACA), e.g., a reaction wheel assembly (RWA) or a control moment gyro (CMG), and a spacecraft body. In one embodiment, a piezoelectric transducer is integrated at each of four attachment points. According to the present invention, information provided by the force sensors is utilized to calculate inertial reference information. The information provided by the force sensors can be utilized in the event that an inertial sensor fails and can also be utilized to provide primary inertial reference information in lower-cost spacecrafts that do not implement an inertial sensor.

According to the present invention, a force sensor is integrated at multiple points where an ACA attaches to a spacecraft body. In this manner, spacecraft rotational motion is sensed as positive and negative voltages at the attachment points. These positive and negative voltages correspond to forces acting upon the spacecraft body, which can be used to determine spacecraft rotational information. Since the mass of each ACA is known and the location of each of the ACAs, with respect to a spacecraft center of gravity, is known, the angular acceleration and angular velocity of the spacecraft can be derived.

It should be appreciated that virtually any spacecraft, which implements an inertial sensor, can utilize this methodology as a backup for the inertial sensor or as a replacement for the inertial sensor as, in general, the motion of a spacecraft is comprised of rotational velocities and rotational accelerations that can be calculated from information provided by force sensors integrated at the attachment points of each ACA. That is, the force sensors associated with each ACA provide angular velocities and angular accelerations about two axes orthogonal to the spin axis of each ACA. Utilizing information provided by three orthogonally positioned ACAs provides acceleration and velocity information that can be averaged to reduce potential error. Since the weight, dimensions and location (with respect to the center of gravity of the spacecraft) of a given ACA are known, both angular velocity and angular acceleration imparted by the ACAs to the spacecraft can be determined.

Implementation of the present invention provides several advantages to spacecraft designers. For example, implementing force sensors at the attachment points provides backup sensor information to an ACA processing system in the event of inertial sensor failure. Further, as previously stated, the force sensors can be utilized in place of a primary inertial sensor on space vehicles which have a limited budget or limited power for sensors. In general, an energy wheel of an ACA has enough secondary power to run an associated force sensor such that no additional power supplies are required. This may reduce spacecraft weight by eliminating the inertial sensor and its associated cabling. Additionally, cabling associated with the force sensors can be routed along the ACA telemetry line. Thus, according to the present invention, utilizing three ACAs each with four force sensors readily allows for computation of spacecraft inertial information. It should be appreciated that the computations of angular acceleration and angular velocity can be accomplished within the ACA electronics, with minimal additional hardware and/or software refinements and in this manner can serve to reduce the processing burden on the ACA processing system.

Figure 1:
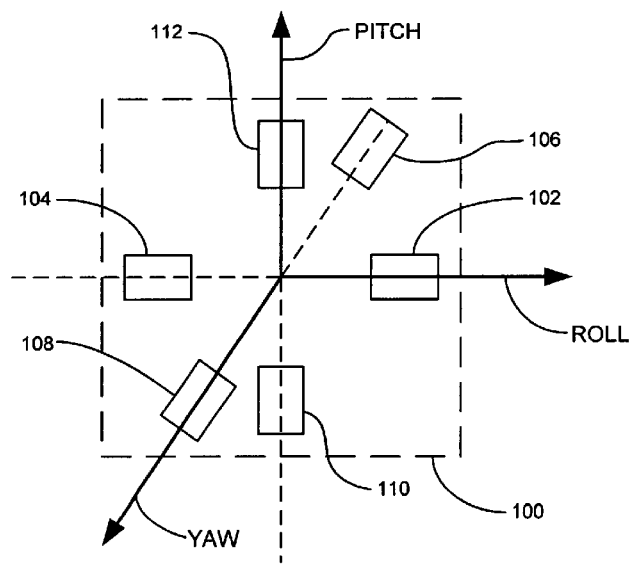
FIG. 1 is a block diagram of an exemplary spacecraft with a plurality of attitude control assemblies oriented along pitch, roll and yaw axes of the spacecraft.

FIG. 1 depicts an exemplary spacecraft 100 that includes a plurality of attitude control assemblies (ACAs) 102–112 aligned along orthogonal axes of the spacecraft 100. For example, the spacecraft 100 may include a pair of ACAs 102 and 104 aligned along a roll axis, a pair of ACAs 106 and 108 aligned along a yaw axis and a pair of ACAs 110 and 112 aligned along a pitch axis. Alternatively, only one ACA may be implemented along a given pitch, roll and yaw axis with an additional ACA positioned for redundancy.

Figure 2:
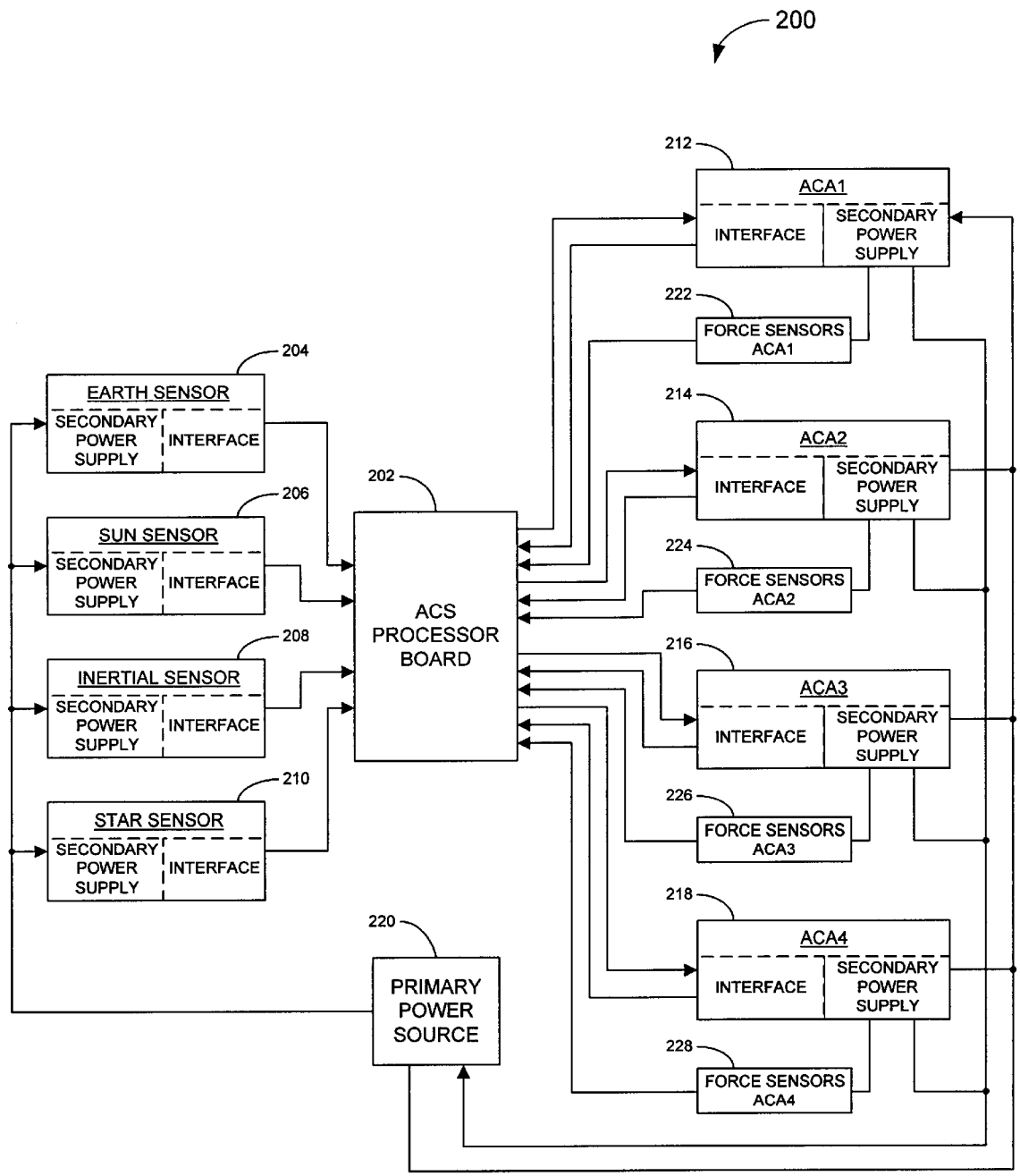
FIG. 2 is an electrical block diagram of an attitude control system, according to one embodiment of the present invention.

FIG. 2 depicts an attitude control system (ACS) 200, which includes an ACS processor board 202, which includes a processor and an application appropriate amount of volatile and non-volatile memory. The ACS processor implements an appropriate communication protocol (e.g., 1553) in communicating with an earth sensor 204, a sun sensor 206, an inertial sensor 208 and a star sensor 210. Similarly, the processor of the ACS processor board 202 may implement the same communication protocol to facilitate communication with attitude control assemblies (ACAs) 212, 214, 216 and 218. As is illustrated, each of the ACAs 212, 214, 216 and 218 includes a secondary power supply, which regulates the power provided by a primary power source 220, due to the fact that the primary power source 220 may provide a voltage that varies, e.g., between twenty and one-hundred volts. Similarly, the earth sensor 204, the sun sensor 206, the inertial sensor 208 and the star sensor 210 may include secondary power supplies that regulate the voltage provided to each of the sensors to an appropriate level.

The ACA 212 may provide power to a plurality of force sensors 222, associated with the ACA 212, and the ACA 214 may similarly provide power to a plurality of force sensors 224, associated with the ACA 214. Likewise, the ACA 216 may provide power to its associated force sensors 226 and the ACA 218 may provide power to its associated force sensors 228. As previously discussed, the force sensors 222, 224, 226 and 228 provide information that can be utilized to determine an angular acceleration and an angular velocity of the spacecraft 100 and are integrated at points where their associated ACA attaches to the spacecraft body. Unprocessed information provided by the force sensors 222, 224, 226 and 228 may be provided directly to the processor board 202 or may be provided to an appropriate ACA, which processes the information and provides processed information to the processor board 202.

Figure 3A:
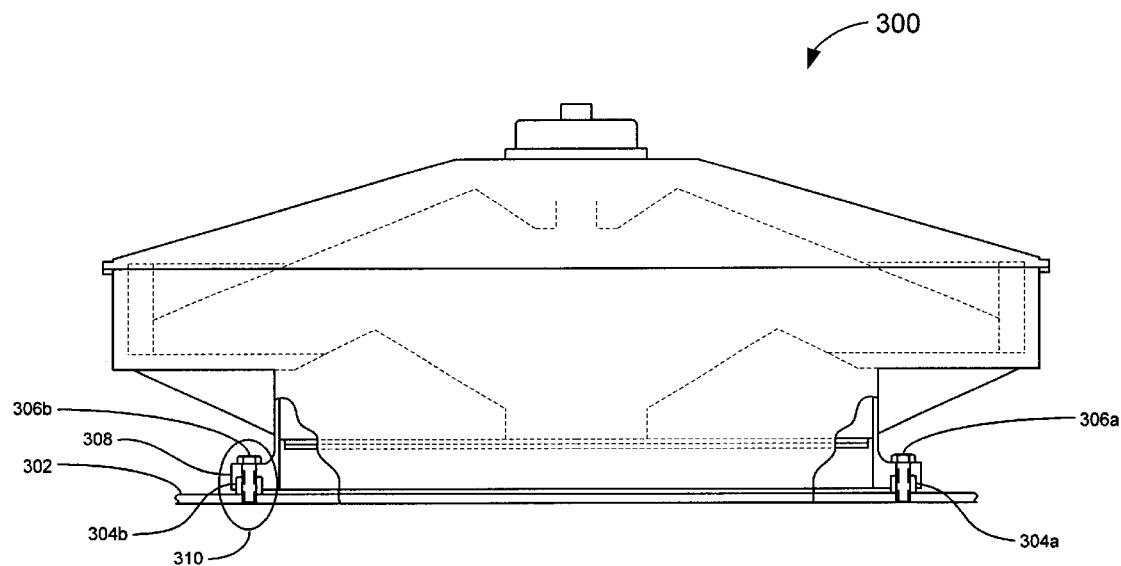
FIG. 3A is a cross-section of an exemplary reaction wheel assembly (RWA) with a piezoelectric transducer located at attachment points between the RWA and a spacecraft body.
Figure 3B:
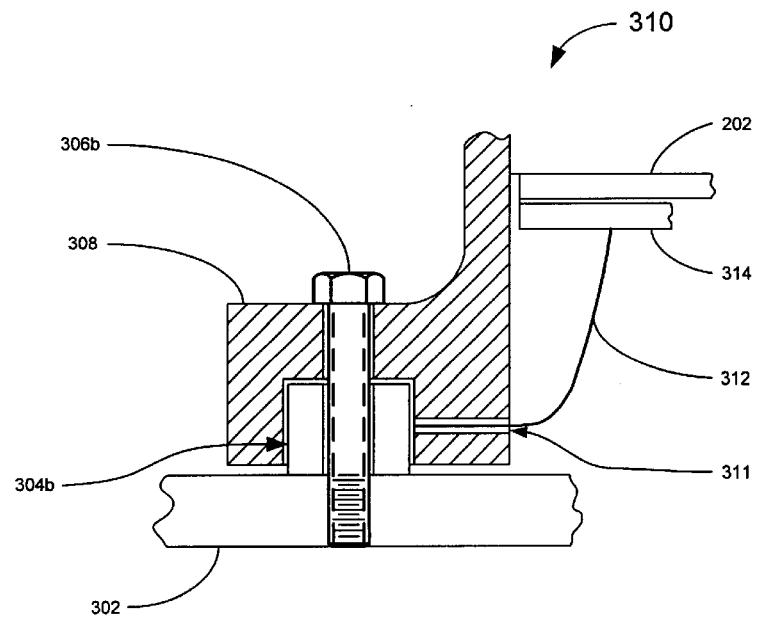
FIG. 3B is an expanded view of one of the attachment points between the RWA and the spacecraft body of FIG. 3A.

FIG. 3A provides a cross-sectional view of an exemplary attitude control assembly (ACA) 300, which is illustrated as a reaction wheel assembly (RWA). According to the present invention, the ACA 300 is coupled to a portion of a spacecraft body 302 at a plurality of attachment points with bolts, e.g., bolts 306a and 306b. Piezoelectric transducers 304a and 304b are integrated at the attachment points between the spacecraft body 302 and the base 308 of the ACA 300. FIG. 3B depicts an expanded view of one attachment area 310. As shown in FIG. 3B, the base 308 of the ACA 300 is configured to receive the piezoelectric transducer 304b and is attached to the spacecraft body 302 with a bolt 306b, which preloads the force sensor 304b. As is shown in FIG. 3B, a cable 312 is provided from the sensor 304b, through an aperture 311 in the base 308, to a sensor interface daughter card 314, which is coupled to then ACS processor board 202.

FIG. 4 is a force diagram of an inertial reference system, according to an embodiment of the present invention. As is discussed above, a satellite may include three or four ACAs, e.g., RWAs, per spacecraft, which are designed to receive force sensors, which provide information that can be combined to allow for error averaging of angular acceleration and angular velocity information. That is, each RWA provides rotation rates and angular velocities about two axes of the spacecraft that are orthogonal to the spin axis of the RWA. These angular accelerations and angular velocities can be used to determine spacecraft rotation rates and accelerations. As shown in FIG. 4, the ACA 300 experiences a tangential force $F_T$ and a normal force $F_N$, which are defined by the equations set forth below:

$$F_T = m\alpha R$$

$$F_N = m\omega^2 R$$

When the sum of the moments about point "O" is equal to zero, i.e., $\Sigma M_O =$, then:

$$F_1 d - F_2 d = m\alpha R$$

If $F_1 = F_2$, then $\alpha = 0$, or $$\alpha = \frac{(F_1 - F_2)d}{mR}$$

When the sum of the forces $F_1$ and $F_2$ is equal to zero, i.e., $\Sigma F = 0$, then:

$$F_1 + F_2 = F_N = \omega^2 m R$$

$$\text{or } \omega = \left(\frac{F_1 + F_2}{mR}\right)^{1/2}$$

Thus, based on the information provided by the force sensors, inertial reference information for the spacecraft can be calculated by associating an output of a force sensor with an associated force.

Accordingly, an inertial reference system has been described herein that integrates force sensors at attachment points between an attitude control assembly and a spacecraft body. In one embodiment, a force sensor is integrated at each of four attachment points, and the information provided by the force sensors is utilized to calculate inertial reference information. In this manner, spacecraft rotational motion is sensed as positive and negative voltages at the attachment points.

The above description is considered that of the preferred embodiments only. Modification of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the Doctrine of Equivalents.

What is claimed is:

1. An inertial reference system for a spacecraft, the system comprising:
   an attitude control assembly coupled to a spacecraft body at a plurality of attachment points; and
   a force sensor integrated at each of the attachment points and operable to supply a force signal representative of a force between the attitude control assembly and the spacecraft body; and
   a processor coupled to receive each force signal and operable, in response thereto, to determine inertial reference information for the spacecraft.

2. The system of claim 1, wherein the force sensors are piezoelectric transducers.

3. The system of claim 1, wherein the attitude control assembly is coupled to the spacecraft body at four attachment points.

4. The system of claim 1, wherein each of the force sensors is preloaded by a bolt that attaches the attitude control assembly to the spacecraft body.

5. The system of claim 1, wherein the attitude control assembly is a reaction wheel assembly (RWA).

6. The system of claim 1, wherein the attitude control assembly is a control moment gyro (CMG).

7. The system of claim 1, wherein the attitude control assembly includes three reaction wheel assemblies (RWAs) that are orthogonally positioned with respect to each other.

8. The system of claim 7, wherein the attitude control assembly includes a redundant RWA.

9. The system of claim 1, wherein the attitude control assembly includes three control moment gyros (CMGs) that are orthogonally positioned with respect to each other.

10. The system of claim 9, wherein the attitude control assembly further includes a redundant CMG.

11. A method spacecraft body inertial information, comprising the steps of:
    providing three attitude control assemblies that are orthogonally positioned with respect to each other;
    providing a first pair of colinear force sensors on a first axis and a second pair of colinear force sensors on a second axis for each of the attitude control assemblies, wherein the first and second axes are orthogonal, and wherein the first and second pair of colinear force sensors are positioned between the attitude control assemblies and the spacecraft body;
    calculating two rotational velocities and two rotational accelerations based on outputs provided by the force sensors for each of the attitude control assemblies; and
    averaging the rotational velocities and the rotational accelerations to minimize errors in the information provided by the force sensors.

12. The method of claim 11, wherein the attitude control assemblies are reaction wheel assemblies (RWAs).

13. The method of claim 11, wherein the attitude control assemblies are control moment gyros (CMGs).

14. The method of claim 11, wherein the force sensors are piezoelectric transducers.

15. An inertial reference system for a spacecraft, the system comprising:
    three attitude control assemblies coupled to a spacecraft body at a plurality of attachment points, wherein the three attitude control assemblies are orthogonally positioned with respect to each other; and
    a force sensor integrated at each of the attachment points and operable to supply a force signal representative of a force between the attitude control assembly and the spacecraft body; and
    a processor coupled to receive each force signal and operable, in response thereto, to determine inertial reference information for the spacecraft.

16. The system of claim 15, wherein the force sensors are piezoelectric transducers.

17. The system of claim 15, wherein each of the attitude control assemblies is coupled to the spacecraft body at four attachment points.

18. The system of claim 15, wherein each of the force sensors is preloaded by a bolt that attaches the attitude control assemblies to the spacecraft body.

19. The system of claim 15, wherein the attitude control assemblies are reaction wheel assemblies (RWAs).

20. The system of claim 15, wherein the attitude control assemblies are control moment gyros (CMGs).

21. The system of claim 15, wherein each of the attitude control assemblies provide power to their associated force sensors.

22. The system of claim 15, wherein interfaces of each of the attitude control assemblies receive signals from their associated force sensors and provides associated signals to an attitude control assembly processor for further processing.

* * * * *